United States Patent
Maes (10) Patent No.: US 8,005,988 B2
(45) Date of Patent: *Aug. 23, 2011

(54) BEST EFFORT SEAMLESS NETWORK SWITCH IN A MEDIA STREAMING SESSION

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/726,568

(22) Filed: Mar. 18, 2010

(65) Prior Publication Data

US 2010/0172360 A1  Jul. 8, 2010

Related U.S. Application Data (63) Continuation of application No. 11/424,414, filed on Jun. 15, 2006, now Pat. No. 7,711,848.

(51) Int. Cl.
*G06F 15/173* (2006.01)
(52) U.S. Cl. .................. 709/239; 709/238
(58) Field of Classification Search .............. 709/217, 709/218, 219, 227, 229, 238, 239, 240, 241, 709/242; 718/104, 105, 108; 714/1, 4
See application file for complete search history.

(56) References Cited

U.S. PATENT DOCUMENTS

| | | | |
|---|---|---|---|
| 7,711,848 B2 | 5/2010 | Maes | |
| 2006/0168334 A1* | 7/2006 | Potti et al. | 709/239 |
| 2006/0200567 A1* | 9/2006 | Cousins et al. | 709/227 |
| 2006/0253605 A1* | 11/2006 | Sundarrajan et al. | 709/238 |
| 2007/0022183 A1* | 1/2007 | Klemets | 709/219 |
| 2007/0174467 A1* | 7/2007 | Ballou et al. | 709/227 |
| 2007/0276925 A1* | 11/2007 | La Joie et al. | 709/219 |
| 2008/0052718 A1* | 2/2008 | Hundscheidt | 718/104 |
| 2009/0055473 A1* | 2/2009 | Synnergren | 709/204 |

OTHER PUBLICATIONS

Understanding SIP, "Today's Hottest Communications Protocol Comes of Age," Ubiquity Whtie Paper, 6 pages.
U.S. Appl. No. 11/424,414, filed Jun. 15, 2006, Notice of Allowance mailed Dec. 16, 2009, 19 pages.
U.S. Appl. No. 11/424,414, filed Jun. 15, 2006, Office Action mailed May 28, 2009, 8 pages.

* cited by examiner

*Primary Examiner* — Le Luu
(74) *Attorney, Agent, or Firm* — Kilpatrick Townsend & Stockton, LLP (57) ABSTRACT

Systems, methods, and machine-readable media are disclosed for switching a media streaming session between a plurality of networks. In one embodiment, a method of switching networks in a media streaming session can comprise detecting a plurality of networks available for communication of streaming data. The plurality of networks can include a first network providing a first streaming session and a second network. A determination can be made as to whether to switch the first streaming session from the first network. Determining to switch the first streaming session from the first network to the second network can be based on detecting a loss of the first network, detecting a lower cost alternative to the first network, etc. In response to determining to switch the first streaming session from the first network, the first streaming session can be switched from the first network to the second network.

21 Claims, 8 Drawing Sheets

BEST EFFORT SEAMLESS NETWORK SWITCH IN A MEDIA STREAMING SESSION

CROSS-REFERENCE TO RELATED APPLICATIONS

This application is a continuation application of co-pending U.S. patent application Ser. No. 11/424,414, filed Jun. 15, 2006 and entitled "A System Using Session Initiation Protocol for Seamless Network Switching in a Media Streaming Session," the entire disclosure of which is hereby incorporated herein by reference for all purposes.

BACKGROUND OF THE INVENTION

Embodiments of the present invention relate generally to providing streaming media across networks and more particularly to switching a media streaming session between a plurality of networks.

Session Initiation Protocol (SIP) and other such signaling protocols are commonly used for establishing sessions over an Internet Protocol (IP) network. Generally speaking, SIP, or in general any session-based or message-based exchange, can be used by an initiating device to request a connection with a server and/or one or more other devices and to establish a streaming session with the other device(s). Such a session can be used for a variety of purposes such as Internet telephony, e.g., Voice over Internet Protocol (VoIP), audio and/or video conferencing, interactive gaming, etc.

Some of these signaling protocols, such as SIP, also allow for the parties to a session to negotiate new streaming or new media types from within a session. However, none of these protocols allow for the parties to easily or seamlessly switch between a plurality of available networks. That is, if a network supporting a session becomes unavailable to one or more of the parties to a session but another network is available, current signaling protocols do not provide a way to seamlessly, or near seamlessly, switch to the other available network. For example, if a user of a wireless device that is participating in a streaming session via a wireless network moves out of an area of coverage for that network or the network otherwise becomes unavailable to that user, there is no way for the user's device to automatically switch the session to another network, wireless, cellular, or other, that may be available. Rather, the user must end the session and establish a new session. In another example, rather than moving out of an area of coverage, the user may move into an area where a cheaper service is available, depending upon the type of service or traffic available to the user.

Hence, there is a need for methods and systems that allow for switching a media streaming session between a plurality of networks based on one or more of a variety of criteria.

BRIEF SUMMARY OF THE INVENTION

Systems, methods, and machine-readable media are disclosed for switching one or more media streaming sessions between a plurality of networks. Switching the first streaming session from the first network to the second network can be performed, for example, by a client device participating in the first session. In one embodiment, a method of switching networks in a media streaming session can comprise detecting a plurality of networks available for communication of streaming data. The plurality of networks can include a first network providing a first streaming session and a second network. A determination can be made as to whether to switch the first streaming session from the first network based on one or more of a variety of criteria. Determining to switch the first streaming session from the first network to the second network can be based on detecting a loss of the first network, detecting a lower cost alternative to the first network, i.e. based on any other criteria as determined by a policy. In response to determining to switch the first streaming session from the first network, the first streaming session can be switched from the first network to the second network. Switching the first streaming session from the first network to the second network can comprise initiating a session on the second network. For example, the second network can comprise a Session Initiation Protocol (SIP) network. In such a case, initiating a session on the second network comprises sending a SIP INVITE message via the second network to another party to the first streaming session. The switch can be initiated by the client, the server, the user, or by the fact that the connection is dropped.

According to one embodiment, switching the first streaming session from the first network to the second network can further comprise copying a data stream from the first session to the second session. In such a case, switching the first streaming session from the first network to the second network can further comprises determining whether the second session is established. In response to determining the second session is established, the first session can be terminated.

According to another embodiment, switching the first streaming session from the first network to the second network can further comprise buffering an outgoing data stream of the first session. The buffering can be performed by a client device participating in the first session. In such a case, the client device can inform a user of the client device of possible delays in the media streaming session. Alternatively or additionally, buffering can be performed by a server participating in the first session. In such a case, the server can buffer the outgoing data stream of the first session in response to losing an incoming data stream of the first session. That is, rather than having two connections established and switching from one to the other, outgoing data can be buffered while the first connection is terminated and the second connection is established. Switching the first streaming session from the first network to the second network can also comprise terminating the first session, initiating a second session on the second network, and streaming outgoing data on the second session. In such a case, streaming outgoing data on the second session can comprise beginning the second session with buffered outgoing data of the first session.

According to yet another embodiment, a system for providing a media streaming session can include a first network and a second network. A server can be communicatively coupled with the first network and the second network and can be adapted to participate in a first streaming session via the first network. The system can also include a client communicatively coupled with the first network and the second network. The client can be adapted to participate in the first streaming session with the server via the first network, detect the second network, and determine whether to switch the first streaming session from the first network. The client can determine to switch the first streaming session from the first network to the second network based on detecting a loss of the first network, based on relative costs of the first network and the second network, etc. In response to determining to switch the first streaming session from the first network, the client can initiate a session on the second network. The second network can comprise, for example, a Session Initiation Protocol (SIP) network. In such a case, initiating a session on the second network can comprise sending a SIP INVITE message via the second network to another party to the first streaming session.

According to one embodiment, the client can be further adapted to copy a data stream from the first session to the second session. In such a case, the client can be further adapted to determine whether the second session is established and, in response to determining the second session is established, terminate the first session. In another embodiment, the client can be further adapted to buffer an outgoing data stream of the first session. In such a case, the client can be further adapted to inform a user of possible delays in the media streaming session. Additionally or alternatively, the server can be further adapted to buffer an outgoing data stream of the first session in response to losing an incoming data stream of the first session. The client can be further adapted to terminate the first session and stream outgoing data on the second session. The client and the server can be adapted to stream outgoing data on the second session beginning with buffered outgoing data of the first session.

According to still another embodiment, a system can comprise a first network and a second network. A first client can be communicatively coupled with the first network and the second network and adapted to participate in a first streaming session on the first network. A second client can be communicatively coupled with the first network and the second network and adapted to participate in the first streaming session with the first client via the first network. The second client can also be adapted to detect the second network and determine whether to switch the first streaming session from the first network. The second client can determine to switch the first streaming session from the first network to the second network based on detecting a loss of the first network, based on relative costs of the first network and the second network, or any other criteria. In response to determining to switch the first streaming session from the first network, the first streaming session can be switched from the first network to the second network.

According to one embodiment, the system can further comprise a server communicatively coupled with the first network and the second network. The server can be adapted to receive a request to establish the first media session from one of the first client or the second client and, in response to the request, establish the first streaming session. Additionally or alternatively, the second client can be adapted to switch the first streaming session from the first network to the second network by initiating a second session on the second network. According to one embodiment, the second network can comprise a Session Initiation Protocol (SIP) network. In such a case, the second client can initiate the second session on the second network by sending a SIP INVITE message via the second network to the server, the SIP INVITE message identifying the first client. The server, in response to detecting the second client initiating a second session on the second network, can be further adapted to maintain the first session and establish the second session. In some cases, the server can be further adapted to inform users of the first client and second client of possible delays in the first session.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form. Importantly, it should be noted that while described herein with reference to Session Initiation Protocol (SIP), embodiments of the present invention are considered to be equally applicable to other protocols used to setup sessions or control call/media exchanges e.g. RTSP, H323, Parlay Call Control, etc. and systems and should not be considered limited to use with SIP. Rather, embodiments of the present invention are thought to be equally applicable to other protocols and systems that support streaming sessions and which are considered to be within the scope of the present invention. For example, embodiments of the present invention can be used with any session based or message based exchange.

Embodiments of the present invention provide methods, system and machine-readable media for switching a media streaming session between a plurality of networks. Generally speaking, switching networks in a media streaming session can comprise detecting a plurality of networks available for communication of streaming data. The plurality of networks can include a first network providing a first streaming session and a second network. A determination can be made as to whether to switch the first streaming session from the first network. Determining to switch the first streaming session from the first network to the second network can be based on detecting a loss of the first network, detecting a lower cost alternative to the first network, etc. In response to determining to switch the first streaming session from the first network, the first streaming session can be switched from the first network to the second network.

It should be noted that numerous variations of the embodiments of the present invention are contemplated. For example, while various embodiments of the present invention provided for detect the presence and/or availability of another network, it should be understood that this detection may in fact, depending upon the implementation, be optional. In other implementations, for example, if the user knows about the networks and/or other devices (e.g. based on any out-of-band information) the user can initiate the switch and/or indicate the network or devices, thereby eliminating the need to detect the other networks or devices.

According to one embodiment, as will be discussed in detail below, the streaming session can be established between a client and a server. Furthermore, switching the first streaming session from the first network to the second network can be performed by the client device participating in the first session. Determining to switch networks can be based, for example, on the client losing the first network, detecting availability of a faster network, detecting availability of a cheaper network, etc.

According to an alternative embodiment, the streaming session can be established between two end devices such as, for example, two clients devices participating in a Voice Over Internet Protocol (VOIP) call or other streaming session. In such a case, a server, such as a SIP system, can be used to establish the session between the two client devices such as SIP clients. The server may or may not also participate in switching between networks. In either case, switching the first streaming session from the first network to the second network can be performed by one of the client devices participating in the first session. Again, determining to switch networks can be based, for example, on the client losing the first network, detecting availability of a faster network, detecting availability of a cheaper network, etc. In another embodiment, switching can be done across multiple devices instead of networks. For example, a switch may be made from a SIP phone to a Public Switched Telephone Network (PSTN) phone using a SIP Call Controller (CC) and a SIP/PSTN Gateway. Conversely a PSTN to SIP switch can also be made. It should be understood that, in such cases, the CC can be SIP, Parlay, Intelligent Network (IN) Call Control), etc.

Figure 1:
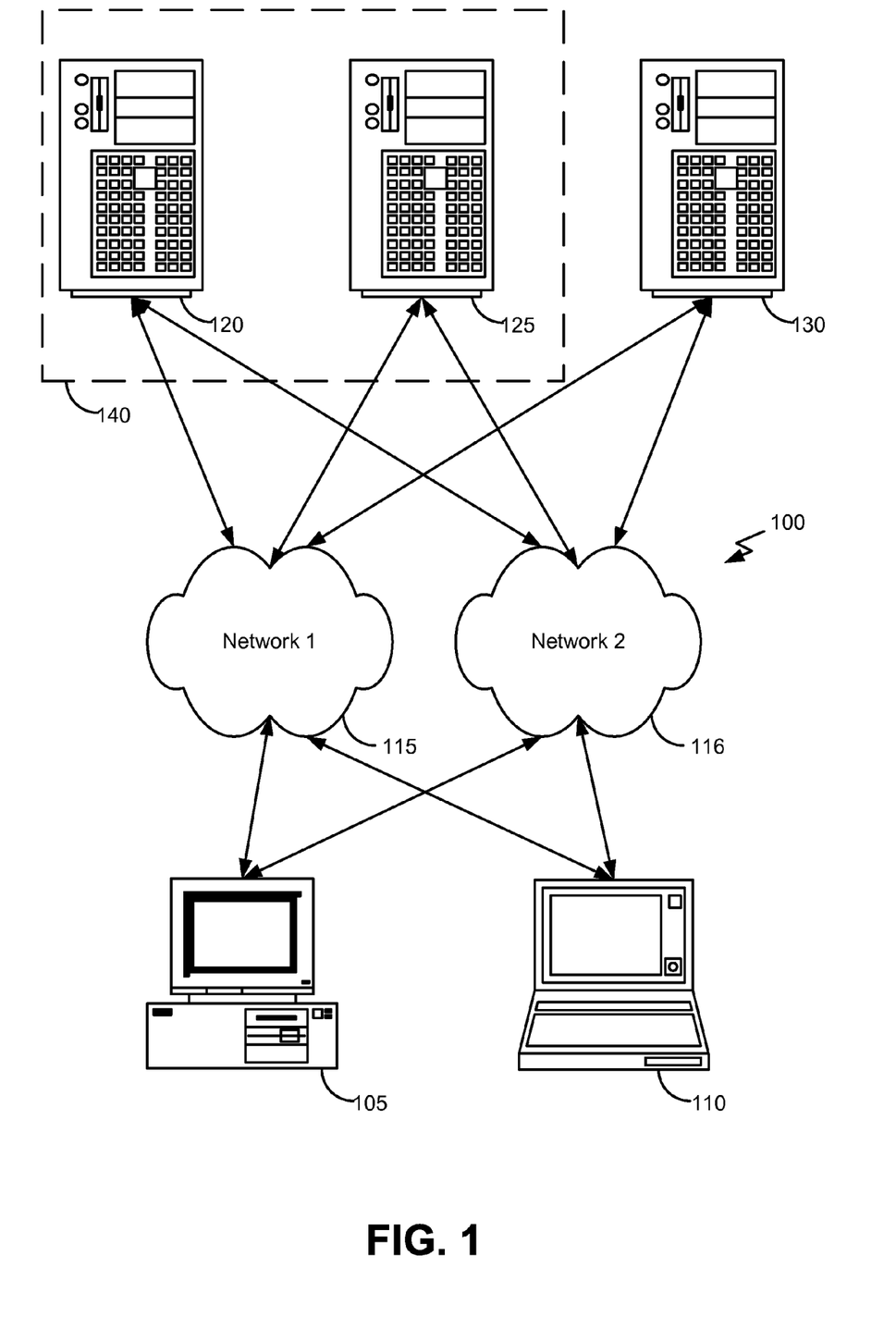
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user devices 105, 110, or agents which may be used to operate a client, whether a dedicate application, web browser, etc. The user devices 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user devices 105, 110 may also have any of a variety of applications, including one or more development systems, database client and/or server applications, and web browser applications. Alternatively, the user devices 105, 110 may be any other electronic device, such as a thin-client computer, Internet-enabled mobile telephone, and/or personal digital assistant, capable of communicating via a network (e.g., the networks 115 and 116 described below) and/or displaying and navigating web pages or other types of electronic documents. Although the exemplary system 100 is shown with two user devices 105 and 110, any number of user devices may be supported.

The system 100 also includes a plurality of networks 115 and 116. The networks may can be any type of network familiar to those skilled in the art that can support data communications using any of a variety of commercially-available protocols, including without limitation TCP/IP, SNA, IPX, AppleTalk, and the like. Merely by way of example, the networks 115 and 116 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks including but not limited to GSM, GPRS, EDGE, UMTS, 3 G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a media server, application server, etc. Such servers may be used to process requests from user computers 105, 110. The applications can also include any number of applications for controlling access to resources of the servers 120, 125, 130.

The media server can be running an operating system including any of those discussed above, as well as any commercially-available server operating systems. As used herein, the term media server refers to any server or other computing device able to process real-time audio and stream it as an endpoint to one or multiple other endpoints. Examples of media servers include, but are not limited to, Cantata media server, Convedia media server, and HP Open View media resource processing/media server According to one embodiment, the media server behaves as a SIP endpoint for SIP networks The media server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

According to one embodiment, one (or more) of the servers 120 can be adapted to participate in a first streaming session via the first network 115. A client 105 can also be adapted to participate in the first streaming session with the server 120 via the first network 115, detect the second network 116, and determine whether to switch the first streaming session from the first network 115. The client 105 can determine to switch the first streaming session from the first network 115 to the second network 116 based on detecting a loss of the first network 115, based on relative costs of the first network 115 and the second network 116, the speed or bandwidth of the first network 115 and the second network 116, or any other criteria. In response to determining to switch the first streaming session from the first network 115, the client 105 can initiate a session on the second network 116. The second network 116 can comprise, for example, a Session Initiation Protocol (SIP) network. In such a case, initiating a session on the second network 116 can comprise sending a SIP INVITE message via the second network 116 to another party to the first streaming session such as server 120.

According to one embodiment, the client 105 can be further adapted to copy a data stream from the first session to the second session. That is, assuming that the client 105 is able to stream data on both networks 115 and 116 at the same time, the client 105 can duplicate the stream on both networks 115 and 116 until the session on the second network 116 is established. In such a case, the client 105 can be further adapted to determine whether the second session is established by, for example, detecting the reception of packets via the second network 116. In response to determining the second session is established, the client 105 can terminate the first session.

In another embodiment, the client 105 can be further adapted to buffer an outgoing data stream of the first session. That is, if the client 105 is unable to stream data on both networks 115 and 116 at the same time, the client 105 can, at first, buffer an outgoing data stream of the streaming session. In such a case, the client 105 can be further adapted to inform a user of possible delays in the media streaming session. Additionally or alternatively, the server 120 can be further adapted to buffer an outgoing data stream of the first session in response to losing an incoming data stream of the first session, i.e., the stream from the client 105. The client 105 can be further adapted to terminate the first session and stream outgoing data on the second session. The client 105 and the server 120 can be adapted to stream outgoing data on the second session beginning with buffered outgoing data of the first session.

Figure 2:
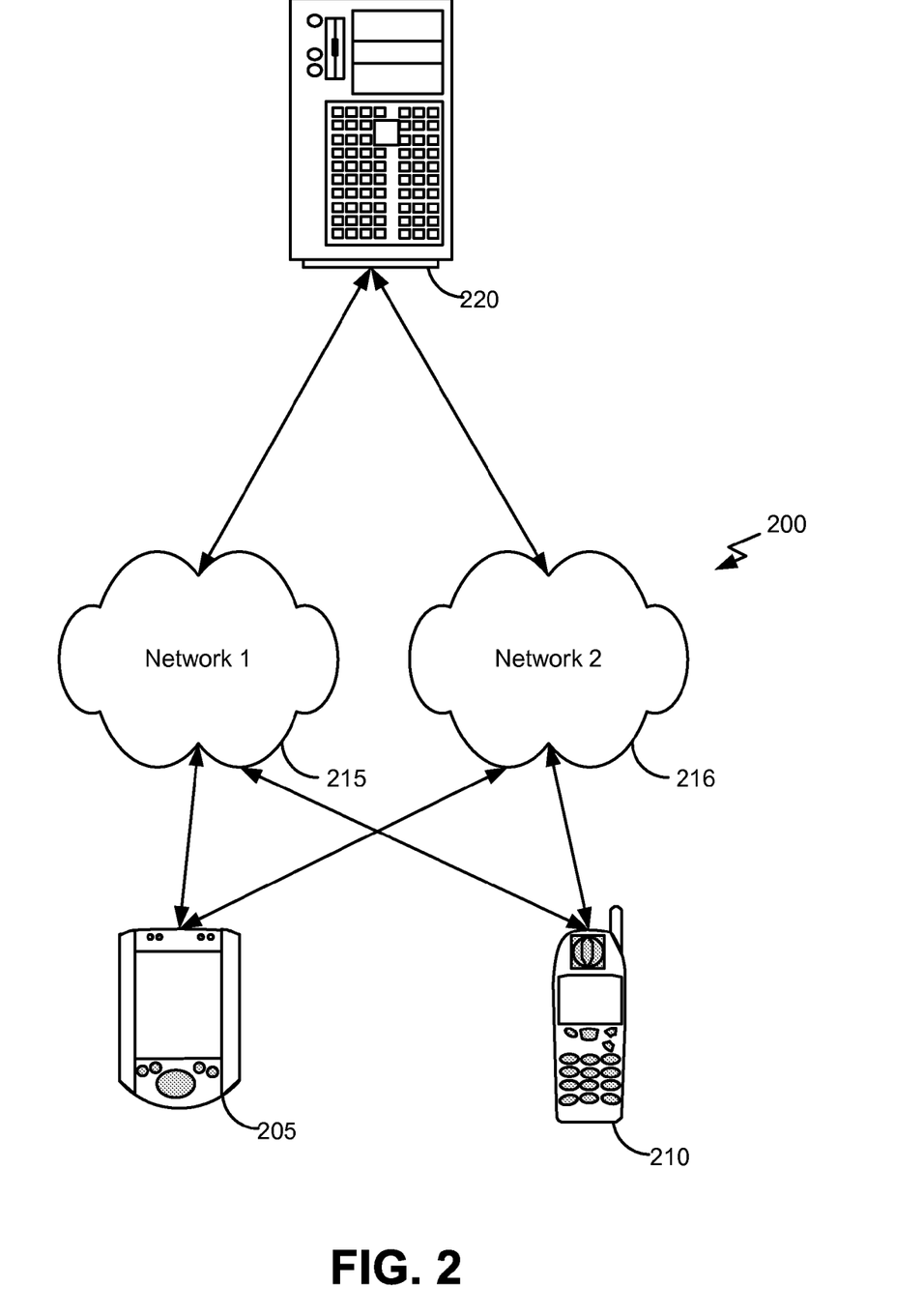
FIG. 2 is a block diagram illustrating components of another exemplary operating environment in which various embodiments of the present invention may be implement.

Alternatively or additionally, a client can also participate in a streaming session with another client or user agent either via a server, after connection with the other device via the server, e.g. client to server to client via sessions passing through the server or through a third-party or multi-party call controller, or strictly on a peer-to-peer basis, e.g., client to client. FIG. 2 is a block diagram illustrating components of another exemplary operating environment in which various embodiments of the present invention may be implement. In one implementation, FIG. 2 illustrates a system that allows users to take advantage of VoIP on mobile phones or other wireless devices even if this is not a service provided by the service provider. In addition, the user or the client device can select the network that is the most appropriate, e.g. cheapest, fastest, etc.

In the example illustrated in FIG. 2, the system 200 includes a plurality of client devices 205 and 210, a plurality of networks 215 and 216, and a media server 220. According to one embodiment, media server may provide for connecting and/or establishing a session between the client devices 205 and 210 as described, for example, in co-pending U.S. patent application Ser. No. 11/383,024, entitled "SIP Routing Customization" filed on May 12, 2006, which is incorporated herein by reference. However, no media server is in fact needed for one to one calls. Furthermore, conference can then be done by calling a conference bridge (VoIP or PSTN). In either case, the clients 205 and 210 can interact peer-to-peer and still be able to individually switch networks. Invitations can be done by a server as $3^{rd}$ party call control. However this behavior is preferred if this goes to non VoIP clients (e.g. PSTN phone/mobile phones) that do not know how to deal with this behavior. In such a case, a media server can be used or buffering of outgoing data streams, holding of the call, and re-establishment can be performed at the SIP gateway.

Therefore, a first client 205 can be communicatively coupled with the first network 215 and the second network 216 and adapted to participate in a first streaming session on the first network 215. A second client 210 can be communicatively coupled with the first network 215 and the second network 216 and adapted to participate in the first streaming session with the first client 105 via the first network 215. The second client 210 can also be adapted to detect the second network 216 and determine whether to switch the first streaming session from the first network. The second client 210 can determine to switch the first streaming session from the first network 215 to the second network 216 based on detecting a loss of coverage or connection, with the first network 215, based on relative costs of the first network 215 and the second network 216, etc. Additionally or alternatively, the determination to switch networks may be based on a user input from a user of first client 205 or the second client 210. In response to determining to switch the first streaming session from the first network 215, the first streaming session can be switched from the first network 215 to the second network 216.

Optionally, a server 220 communicatively coupled with the first network 215 and the second network 216 can be adapted to receive a request to establish the first media session from one of the first client 205 or the second client 210 and, in response to the request, establish the first streaming session. Additionally or alternatively, the second client 210 can be adapted to switch the first streaming session from the first network 215 to the second network 216 by initiating a second session on the second network 216. According to one embodiment, the second network 216 can comprise a Session Initiation Protocol (SIP) network. In such a case, the second client 210 can initiate the second session on the second network 216 by sending a SIP INVITE message via the second network 216 to the server 220, the SIP INVITE message identifying the first client 105. The server 220, in response to detecting the second client 210 initiating a second session on the second network 216, can be further adapted to maintain the first session and establish the second session. In some cases, the server 220 can be further adapted to inform users of the first client 205 and second client 210 of possible delays in the first session.

According to one embodiment, rather than the second client 210 initiating a second session on the second network 216, the server 220 or another entity, such as a third party client controller (not shown here), may initiate the second session. That is, the server 220 or other entity can monitor the communication between the first client 105 and the second client 210 and/or the networks available and determine whether a "better" network is available. The server 220 of other entity determining whether to switch networks can be determined, as when determined by the client 210, based on the first network 215 becoming unavailable or on a number of other criteria including cost of the second network 216 relative to the first network 215 or any other criteria. As noted above, the determination to switch networks may additionally or alternatively be based on a user input from a user of first client 205 or the second client 210.

Figure 3:
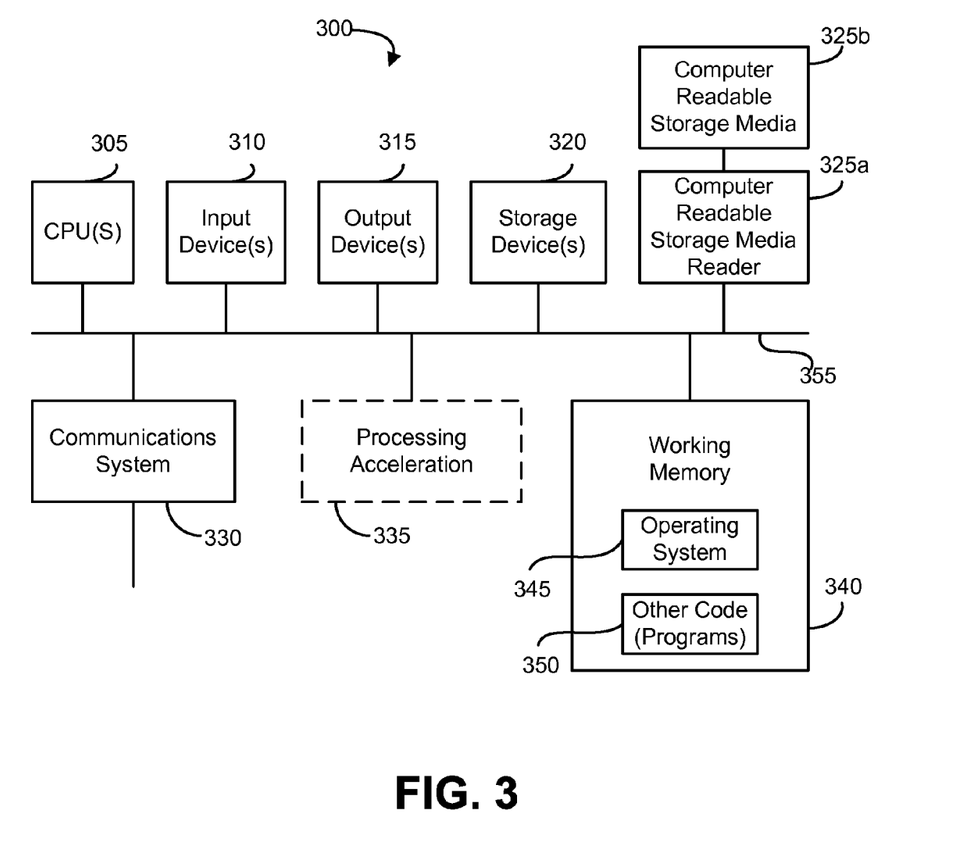
FIG. 3 is a block diagram illustrating an exemplary computer system in which embodiments of the present invention may be implemented.

FIG. 3 illustrates an exemplary computer system 300, in which various embodiments of the present invention may be implemented. The system 300 may be used to implement any of the computer systems described above. The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325a, a communications system 330 (e.g., a modem, a network card (wireless or wired), an infra-red communication device, etc.), and working memory 340, which may include RAM and ROM devices as described above. In some embodiments, the computer system 300 may also include a processing acceleration unit 335, which can include a DSP, a special-purpose processor and/or the like.

The computer-readable storage media reader 325a can further be connected to a computer-readable storage medium 325b, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with the network 320 and/or any other computer described above with respect to the system 300.

The computer system 300 may also comprise software elements, shown as being currently located within a working memory 340, including an operating system 345 and/or other code 350, such as an application program (which may be a client application, web browser, mid-tier application, RDBMS, etc.). It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed. Software of computer system 300 may include code 350 for implementing processes for dynamically providing multimodal and/or multi-device configuration and support.

Generally speaking, switching networks in a media streaming session can comprise detecting a plurality of networks available for communication of streaming data. The plurality of networks can include a first network providing a first streaming session and a second network. A determination can be made as to whether to switch the first streaming session from the first network. This can be done, for example, based on external information e.g., the user may collect information related to the networks or devices being used and/or available, make a decision to switch manually, and instruct the device to switch networks and/or devices. Determining to switch the first streaming session from the first network to the second network can be based on detecting a loss of the first network, detecting a lower cost alternative to the first network, etc. Such a determination can be made by the client and/or by the server. In response to determining to switch the first streaming session from the first network, the first streaming session can be switched, voluntarily or because of drop by client or by server, from the first network to the second network. Also as noted above, the streaming session can be established between a client and a server or between two end devices such as, for example, two clients devices participating in a Voice Over Internet Protocol (VOIP) call or other streaming session. Furthermore, switching the first streaming session from the first network to the second network can be performed by one of the clients participating in the first session. A server may or may not also participate in switching between networks. In either case, switching the first streaming session from the first network to the second network can be performed by one of the client devices participating in the first session. Switching can also be done by the server or third-party client controller if the server or client controller knows the target address and how to address the client on both networks. Determining a target address may be performed automatically by the client devices and/or the servers participating the session or may be provided by a user of one of the client devices, for example, when one of the users decides to manually initiate the switch. According to one embodiment, determining a target address may be facilitated by using presence information obtained, for example, from a SIP registrar and/or location server or another repository. For example, see co-pending U.S. patent application Ser. No. 11/383,817, filed May 17, 2006, entitled "Presence Based Notification," which is incorporated herein by reference and describes methods and systems for providing notifications of communications based on presence information. In another embodiment, the client may additionally or alternatively send a new address via an out-of-band channel to server.

Figure 4:
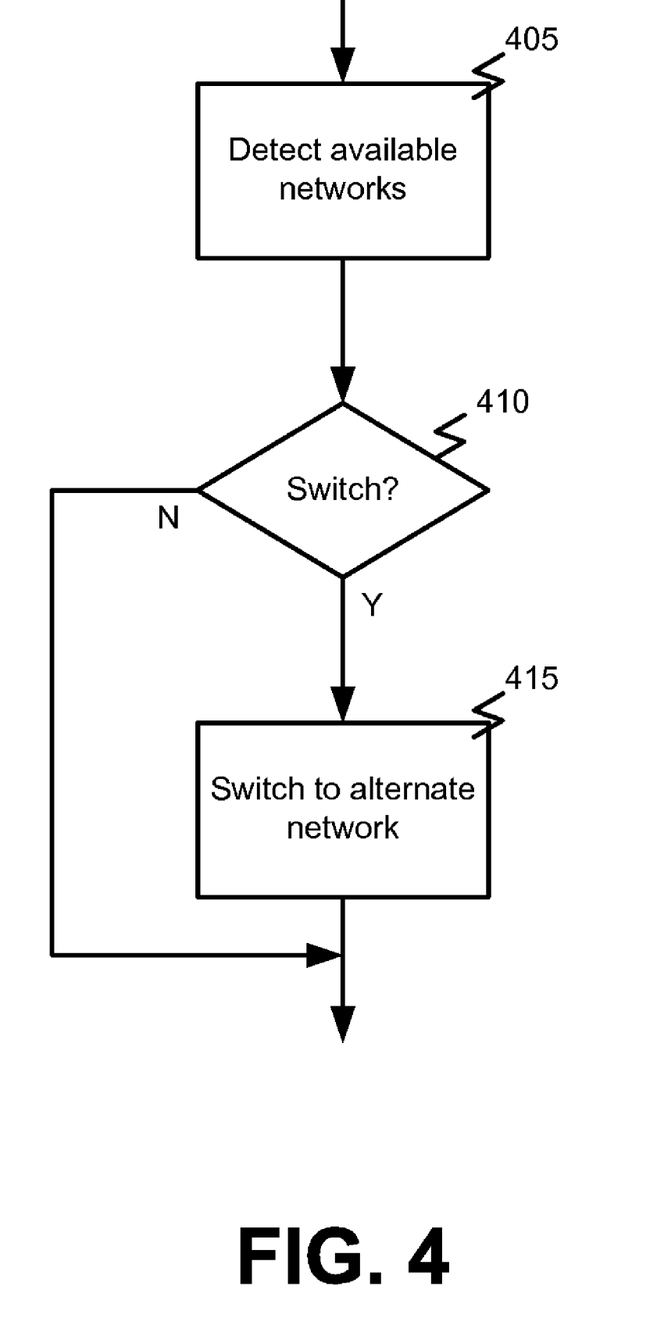
FIG. 4 is a flowchart illustrating, at a high level, a process for switching networks in a media streaming session according to one embodiment of the present invention.

FIG. 4 is a flowchart illustrating, at a high level, a process for switching networks in a media streaming session according to one embodiment of the present invention. Here, the process begins with detecting 405 a plurality of networks available for communication of streaming data. As noted above, the plurality of networks can include at least a first network providing a first streaming session and a second network. That is, the first network can be a network that is currently or initially used to provide or support the first, i.e., current or initial, streaming session. The first and/or second network can, for example, comprise a Session Initiation Protocol (SIP) network. These networks can be known by the client device and/or server and detected by checking the availability of the network, may be dynamically discovered, or may be detected by other means.

A determination 410 can be made as to whether to switch the first streaming session from the first network. That is, a determination 410 can be made as to whether the first network or the second network is "better" for use at the current time. This determination 410 can be based on any of a wide variety of criteria. For example, determining to switch the first streaming session from the first network to the second network can be based on detecting a loss of the first network, i.e., the first network becoming unavailable. In other cases, the determination may be based on the relative costs of the networks, i.e., the second network is cheaper than the first, the relative speeds of the networks, i.e., the second network is faster than the first, etc.

In response to determining to switch the first streaming session from the first network, the first streaming session can be switched 415 from the first network to the second network. Switching 415 the first streaming session from the first network to the second network can comprise initiating a session on the second network. Where the network used to provide the streaming session(s) is a SIP network, initiating a session on the second network can comprise sending a SIP INVITE message via the second network to another party to the first streaming session. As will be discussed in greater detail below, once a second session has been initiated, switching of the sessions can proceed in a number of different manners.

Figure 5:
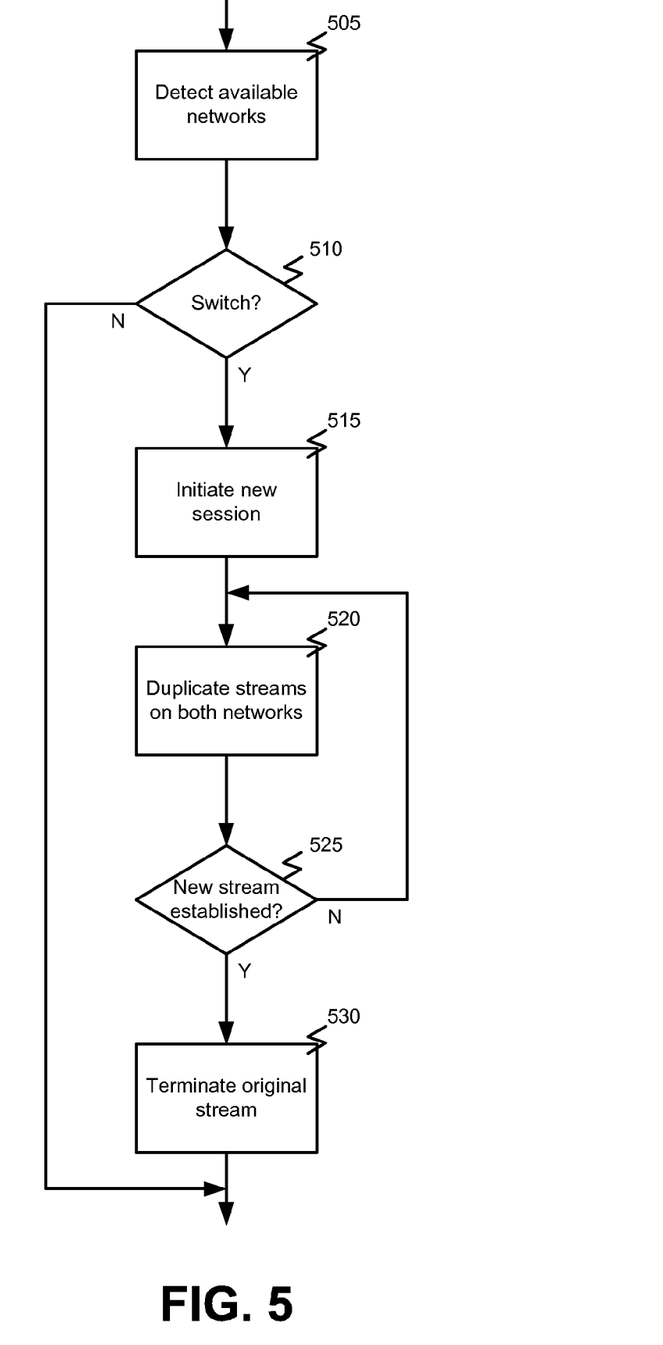
FIG. 5 is a flowchart illustrating additional details of a process for switching networks in a media streaming environment according to another embodiment of the present invention.

FIG. 5 is a flowchart illustrating additional details of a process for switching networks in a media streaming environment according to another embodiment of the present invention. Here, as in the previous example, the process begins with detecting 505 a plurality of networks available for communication of streaming data. As noted above, the plurality of networks can include at least a first network providing a first streaming session and a second network. That is, the first network can be a network that is currently or initially used to provide or support the first, i.e., current or initial, streaming session. The first and/or second network can, for example, comprise a Session Initiation Protocol (SIP) network. These networks can be known by the client device and/or server and detected by checking the availability of the network, may be dynamically discovered, or may be detected by other means.

A determination 510 can be made as to whether to switch the first streaming session from the first network. That is, a determination 510 can be made as to whether the first network or the second network is "better" for use at the current time. This determination 510 can be based on any of a wide variety of criteria. For example, determining to switch the first streaming session from the first network to the second network can be based on detecting a loss of the first network, i.e., the first network becoming unavailable. In other cases, the determination may be based on the relative costs of the networks, i.e., the second network is cheaper than the first, the relative speeds of the networks, i.e., the second network is faster than the first, etc. It should be noted that the determination to switch devices or networks need not be solely determined by the client but may additionally or alternatively be determined by the server. Furthermore, the determination to switch devices or networks may be the result of applying any criteria or may be initiated by the user of the client device based on external information.

In response to determining 510 to switch the first streaming session from the first network, the first streaming session can be switched from the first network to the second network. Switching the first streaming session from the first network to the second network can comprise initiating 515 a session on the second network. Where the network used to provide the streaming session(s) is a SIP network, initiating 515 a session on the second network can comprise sending a SIP INVITE message via the second network to another party to the first streaming session. Initiation 515 of the session on the second network can be performed based on the client issuing an INVITE message or based on the server or, depending upon the implementation, the third-party client controller issuing an INVITE message.

In this example, switching the first streaming session from the first network to the second network can further comprise copying or duplicating 520 a data stream from the first session to the second session. That is, a data stream from the client to the server and/or from the server to the client can be duplicated and streamed at the same time on both networks.

Furthermore, switching the first streaming session from the first network to the second network can comprise determining 525 whether the second session is established. That is, the second session on the second network can be monitored or checked to determine 525 whether the session is available, functioning, and/or synchronized with the first session. In response to determining the second session is established, the first session can be terminated 530.

Figure 6:
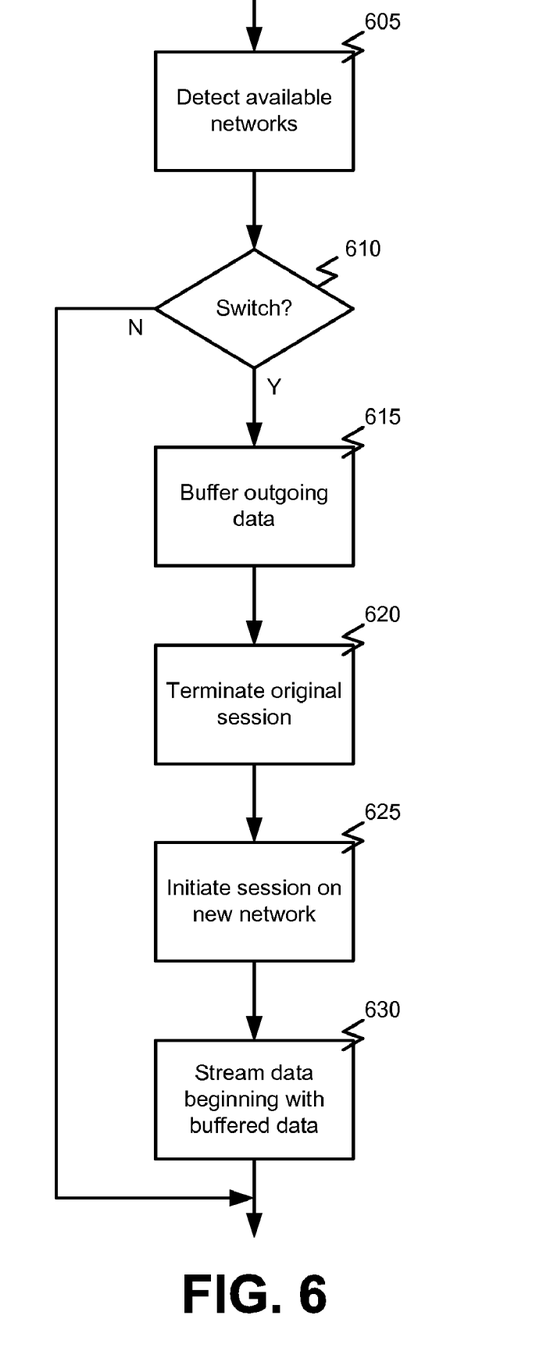
FIG. 6 is a flowchart illustrating a process for switching networks in a media streaming environment according to yet another embodiment of the present invention.

FIG. 6 is a flowchart illustrating a process for switching networks in a media streaming environment according to yet another embodiment of the present invention. As above, the process begins with detecting 605 a plurality of networks available for communication of streaming data. A determination 610 can be made as to whether to switch the first streaming session from the first network. This determination 610 can be based on any of a wide variety of criteria. For example, determining to switch the first streaming session from the first network to the second network can be based on detecting a loss of the first network, i.e., the first network becoming unavailable. In other cases, the determination may be based on the relative costs of the networks, i.e., the second network is cheaper than the first, the relative speeds of the networks, i.e., the second network is faster than the first, etc. It should be noted that the determination to switch devices or networks need not be solely determined by the client but may additionally or alternatively be determined by the server. Furthermore, the determination to switch devices or networks may be the result of applying any criteria or may be initiated by the user of the client device based on external information. In response to determining to switch the first streaming session from the first network, the first streaming session can be switched from the first network to the second network.

In this example, switching the first streaming session from the first network to the second network can further comprises buffering 615 an outgoing data stream of the first session. Buffering 615 can be performed by a client device participating in the first session. In such a case, the client device may inform a user of the client device of possible delays in the media streaming session such as by giving a audio, visual, or other signal to the user. Alternatively or additionally, buffering 615 can be performed by a server participating in the first session. For example, the server may buffer an outgoing data stream of the first session in response to losing an incoming data stream of the first session.

After buffering 615, switching the first streaming session from the first network to the second network can further comprise terminating the first session 625 and initiating 630 a second session on the second network. As noted above, where the network used to provide the streaming session(s) is a SIP network, initiating 630 a session on the second network can comprise sending a SIP INVITE message via the second network to another party to the first streaming session. As noted above, initiation 630 of the session on the second network can be performed based on the client issuing an INVITE message or based on the server or, depending upon the implementation, the third-party client controller issuing an INVITE message.

After initiating 630 the second session, outgoing data can be streamed 635 on the second session. Streaming 635 outgoing data on the second session can begin with buffered outgoing data of the first session. That is, data buffered by the client and/or the server while the second session was being established may be streamed first, until finished, before new data is streamed in order to preserve the continuity of the data.

Figure 7:
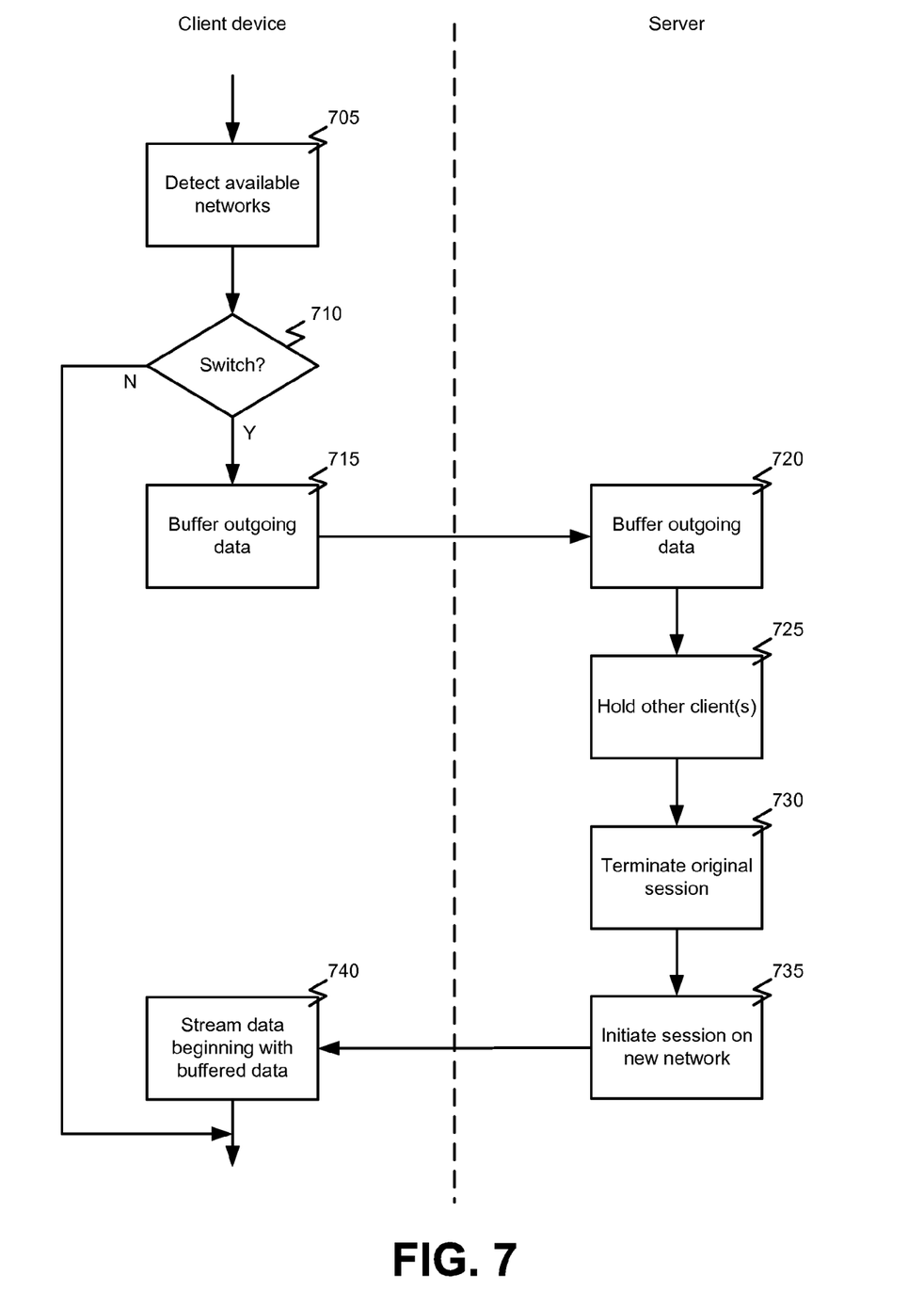
FIG. 7 is a flowchart illustrating a process for switching networks in a media streaming environment according to still another embodiment of the present invention.

FIG. 7 is a flowchart illustrating a process for switching networks in a media streaming environment according to still another embodiment of the present invention. Here, the process begins with the client device detecting 705 a plurality of networks available for communication of streaming data. As noted above, the plurality of networks can include at least a first network providing a first streaming session and a second network. That is, the first network can be a network that is currently or initially used to provide or support the first, i.e., current or initial, streaming session. The first and/or second network can, for example, comprise a Session Initiation Protocol (SIP) network. These networks can be known by the client device and/or server and detected by checking the availability of the network, may be dynamically discovered, or may be detected by other means.

A determination 710 can be made by the client device as to whether to switch the first streaming session from the first network. That is, a determination 710 can be made as to whether the first network or the second network is "better" for use at the current time. This determination 710 can be based on any of a wide variety of criteria. For example, determining to switch the first streaming session from the first network to the second network can be based on detecting a loss of the first network, i.e., the first network becoming unavailable. In other cases, the determination may be based on the relative costs of the networks, i.e., the second network is cheaper than the first, the relative speeds of the networks, i.e., the second network is faster than the first, etc.

In this example, switching the first streaming session from the first network to the second network can further comprises the client buffering 715 an outgoing data stream of the first session. Additionally, buffering 720 can be performed by a server participating in the first session. For example, the server may buffer 720 an outgoing data stream of the first session in response to losing an incoming data stream of the first session. Furthermore, the server can maintain or hold 725 the data streams to or from other client devices participating in the streaming session. That is, the server can buffer what clients or other endpoints are sending. It can then send to the reconnected endpoint what has been "missed." It should be understood that alternatively there may be a case where the client does not buffer and only the server buffers the data from others.

The server can then terminate 730 the first session and initiate 735 a second session on the second network. As noted above, where the network used to provide the streaming session(s) is a SIP network, initiating 730 a session on the second network can comprise sending a SIP INVITE message via the second network to another party to the first streaming session. As noted above, initiation 730 of the session on the second network can be performed based on the client issuing an INVITE message or based on the server or, depending upon the implementation, the third-party client controller issuing an INVITE message.

After initiating 730 the second session, outgoing data can be streamed 735 on the second session by the client device. Streaming 735 outgoing data on the second session can begin with buffered outgoing data of the first session. That is, data buffered by the client(s) while the second session was being established may be streamed first, until finished, before new data is streamed in order to preserve the continuity of the data. It should be noted that streaming 735 outgoing data on the second session may alternatively be initiated by client if it knows where to connect to the server.

Figure 8:
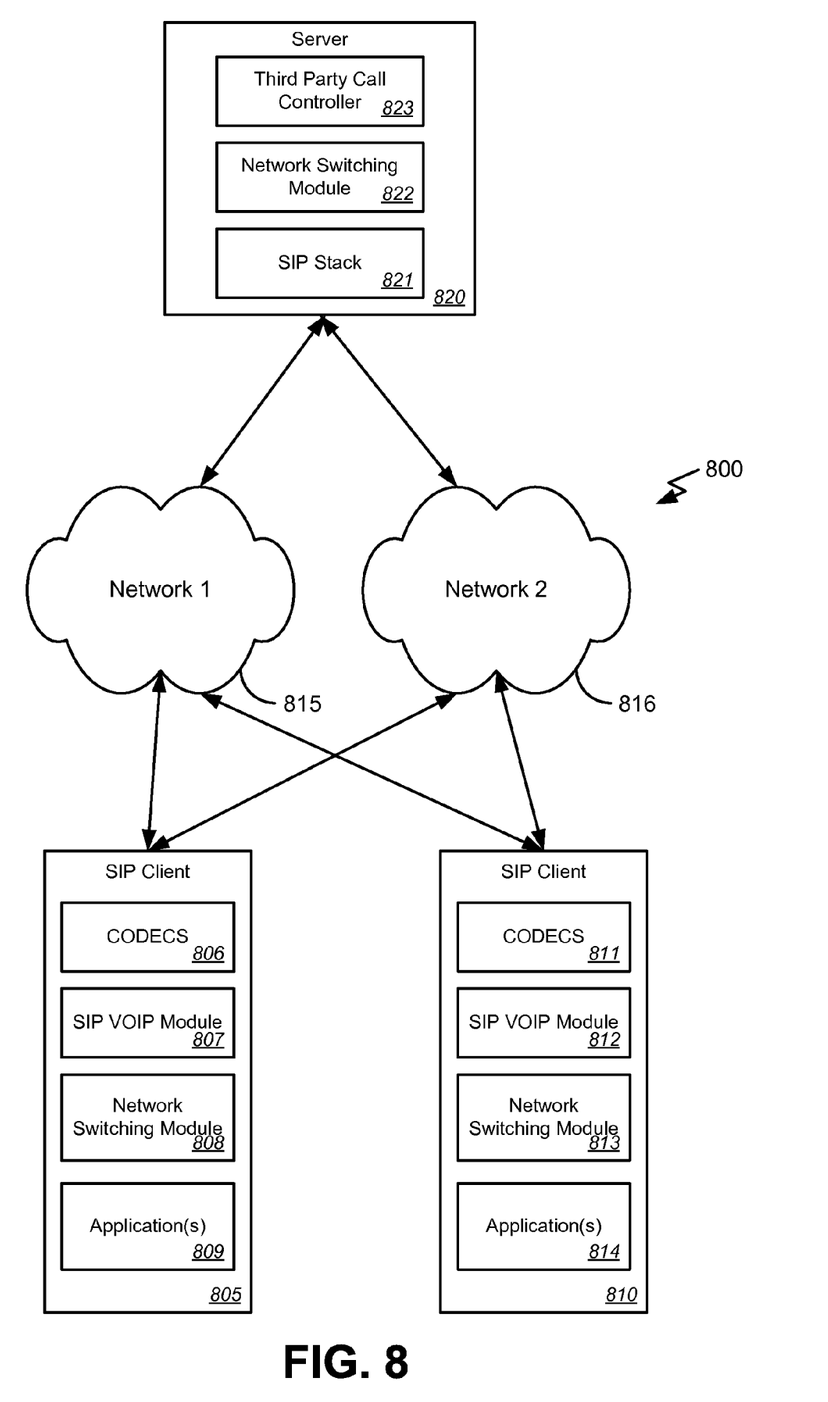
FIG. 8 is a block diagram illustrating components of yet another exemplary operating environment in which various embodiments of the present invention may be implement.

The methods described above can be used in a variety of environments for switching one or more media streaming sessions between a plurality of networks. Importantly, the types of networks and types of devices used can vary depending upon the implementation. FIG. 8 is a block diagram illustrating components of yet another exemplary operating environment in which various embodiments of the present invention may be implemented to provide specific functionality. More specifically, FIG. 8 illustrates a system 800 that allows users to take advantage of VoIP on SIP enabled mobile phones or other wireless devices even if this is not a service provided by the service provider. In addition, the user or the SIP device can select the network that is the most appropriate, e.g. cheapest, fastest, etc.

In the example illustrated in FIG. 8, the system 800 includes a plurality of SIP client devices 805 and 810, a plurality of networks 815 and 816, and a server 820. According to one embodiment, server 820 may provide for connecting and/or establishing a session between the SIP client devices 805 and 810 via $3^{rd}$ party or multi party call control. In one embodiment, this can be implemented using the mechanism described, for example, in co-pending U.S. patent application Ser. No. 11/383,024, filed on Aug. 12, 2006, entitled "SIP Routing Customization," which is incorporated herein by reference. Note however, that no media server is needed for one to one calls. Rather, conferencing can be done by calling a conference bridge (VoIP or PSTN) or any other application playing the role of this/multi party call controller. In either case, the SIP clients 805 and 810 can interact peer-to-peer. A media server of course can be involved. In addition, as described so far, they are still be able to individually switch networks 815 and 816. Invitations are still done by a server 820 as $3^{rd}$ party call control. However a media server is preferred if this goes to non VoIP clients (e.g. PSTN phone/mobile phones) that do not know how to deal with this behavior. In such a case, a media server 820 can be used or buffering of outgoing data streams, holding of the call, and re-establishment can be performed at the SIP gateway.

Therefore, a first client 805 can be communicatively coupled with the first network 815 and the second network 816 and adapted, via one or more appropriate CODECS 806 and SIP VOIP module 807, to participate in a first VOIP session on the first network 815. A second SIP client 810 can be communicatively coupled with the first network 815 and the second network 816 and also be adapted, via one or more appropriate CODECS 811 and SIP VOIP module 812, to participate in the first VOIP session with the first SIP client 805 via the first network 215. The first client can request that a call be established via $3^{rd}$ party or multi-party call control by the server via any mechanism that can communicate that request to the server (e.g. a browser, an application on the client or other device (e.g. on a PC), SMS or other messaging such as email, etc.).

The second SIP client 810 can also be adapted, via network switching module 813, to detect the second network 816 and determine whether to switch the first VOIP session from the first network 815. The second SIP client 810 can determine to switch the first VOIP session from the first network 815 to the second network 816 based on detecting a loss of the first network 815, based on relative costs of the first network 815 and the second network 816, etc. In response to determining to switch the first VOIP session from the first network 815, the first VOIP session can be switched from the first network 815 to the second network 816 as described above with reference to FIG. 7. That is, while the VOIP session is being switched from the first network 815 to the second network, the first SIP client 805 may be placed on hold.

Optionally, a server 820 can be communicatively coupled with the first network 815 and the second network 816. The server 820 can be adapted, via SIP stack 821, to receive a request to establish the first SIP session from one of the first SIP client 805 or the second SIP client 810 and, in response to the request, establish the first SIP session. Additionally or alternatively, the second SIP client 810 can be adapted to switch the first SIP session from the first network 815 to the second network 816 by initiating a second session on the second network 816 by sending a SIP INVITE message via the second network 816 to the server 820, the SIP INVITE message identifying the first SIP client 805. The server 820, in response to detecting the second SIP client 210 initiating a second session on the second network 216, can be further adapted to maintain the first session and establish the second session, i.e., hold the first SIP client while the switch is being performed. In some cases, the server 820 can be further adapted to inform users of the first SIP client 805 and second SIP client 810 of possible delays in the first session.

In some cases, the server 820, via SIP stack 821, in response to receiving the SIP INVITE message from the second SIP client 810 may determine an address for contacting the first SIP client. That is, as described in "SIP Routing Customization" referenced above, the SIP stack 821 of the server 820 may determine an address for the first SIP client 805 to which the SIP INVITE message will be sent. Furthermore, in some cases, the SIP stack may determine an address for contacting the first SIP client based on presence information related to the first SIP client 805. This information may be maintained by the SIP stack 821 or may be obtained from a presence server (not shown here).

According to one embodiment, rather than the second SIP client 810 initiating a second session on the second network 816, the server 820, via a third party call controller 823, may initiate the second session. That is, the server 820 can monitor the communication between the first SIP client 805 and the second SIP client 810 and/or the networks available and determine whether a "better" network is available. The server 820 can then determine whether to switch networks based on the first network 815 becoming unavailable or on a number of other criteria including cost of the second network 816 relative to the first network 815 or any other criteria.

In use, the system 800 allows, for example, VoIP calls on PSTN or wireless/cellular networks even when appropriate phones are not available. For example, one or more of the networks 815 and 816 may be a data network such as the Internet or other LAN or WAN. The user of one of the clients 805 can dial another client 810 using an application on the first client 805. The server 820 can receive the dialing instructions, e.g. posted via HTTP by a webpage or an application on the client device 805 such as a java client application. Using browser messaging such as described in U.S. patent application Ser. No. 10/684,686 entitled "Intelligent Messaging," filed Oct. 13, 2003, which is hereby incorporated by reference in its entirety for all purposes or voice/DTMF access, the user can request to establish a call between his phone (phone #) and a target number to call. Alternatively, the user may actually do that from another phone or device rather than just checking that phone is known and making the request. However, in such a case, explicit authentication may be requested of the user. Also savings and advantages may depend on VoIP service provider setup (e.g. SIP gateway local to both numbers). However, if the service provider is able to collect the location of the user (e.g. by caller ID if different/land phone, the mobile location from a location server/enabler (e.g. OMA location enabler), GPS, or by asking the user when he/she interacts with the user), then calls to the user could be cheap even if he/she is internationally roaming (as he/she would/could be reached from a local number in roaming area/country).

In response, the server 820 can establish a session with the client device 805. Furthermore, the server can invite the target client device 810, for example by sending a SIP INVITE message. The server can then get data from one client 810 and send to the other client 805 (a la conferencing). Conferencing of more users/clients can be provided similarly. Via the server, and utilizing the methods described above, the clients 805 and 810 can switch between the networks 815 and 816 as appropriate. However, when switching between networks 815 and 816 in this example, the server 820 should be adapted to maintain or hold the call between the clients 805 and 810 while changing the sessions as described above with reference to FIG. 7. Also as noted above, when the server 820 places the clients 805 and 810 on hold, various means may be used to inform the users of the hold condition such as a blank sound, music, a "Please hold" message, etc.

Functionality of this approach will depend on the services provided by the VoIP operator/service provider operating server 820. If that service provider is a true VoIP provider it can connects to PSTN phones via local gateways, therefore significantly reducing the cost to traffic over wireless network (if billed) and cost of a local call plus a service fee possibly. Otherwise it may already reduce the cost for roaming/internationally roaming users that call from the location of the SIP/PSTN gateway associated to the media server.

In another example, when a user (e.g., VoIP caller) of one client 805 calls another client 810, the call can be directed to the server 820, the user of that client 810 can be invited, and the call can proceeds as a conference as described above. As noted above, more users may be added, or "conferenced" to the call. If the VoIP service provider of the server 820 permits, calls can be issued from a PSTN. Such calls can be converted at the SIP gateway and the subsequent steps described above can be the same as for a VoIP caller. Again, users may switch networks at any time.

In another variation, no server 820 may in fact be needed for one to one calls. In such a case, conferencing can be done by calling a conference bridge (VoIP or PSTN). if there is a registrar and/or location server (with presence) and/or router as described in "SIP Routing Customization" referenced above. In such a case, the VoIP clients 805 and 810 can interact peer to peer and still be able to individually switch networks. Invitations can still be done by a server acting as a third-party call controller. However, a third-party call controller may be needed if calling to non-VoIP clients (e.g. PSTN phones or mobile phones) that do not know how to deal with this behavior. In such a case a server 820 acting as a third-party call controller can be adapted to provide buffering, holding of the call, and re-establishing of the connection as described above.

In yet another variation, some phones may be designed, as time goes by, to link dialed number with initiating a VoIP call (sending a SIP INVITE). This can be considered as a particular case where the click to dial application is on the client 805. In such a case, the client 805 can be adapted to send the SIP INVITE as would the server 820 as described above. Additionally or alternatively, the clients 805 and 810 may be adapted to select different CODECS depending upon the network(s) 815 and 816 utilized.

Therefore, embodiments of the present invention, among other functionality, provides system and methods to support a mobile VoIP service that extends to mobile the features of VoIP services independent of the underlying network as well as to allow for dynamic switching between networks based on any of a variety of conditions or criteria. Furthermore, these embodiments provide for use with existing phones without a VoIP adapter/router to be added to the network on the endpoint side, the ability to be reachable and be able to use VoIP calls in VoIP while mobile, and the ability to seamlessly switch network as available and preferred and even change CODECS accordingly.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of switching networks in a media streaming session, the method comprising:
   detecting by a computing device a plurality of networks available for communication of streaming data, wherein the plurality of networks includes at least a first network providing a first streaming session between a first communication device and a second communication device and a second network;
   determining by the computing device whether to switch the first streaming session from the first network to the second network; and
   in response to determining to switch the first streaming session from the first network to the second network, switching by the computing device the first streaming session from the first network to the second network, wherein switching the first streaming session from the first network to the second network comprises initiating a second session between the first communication device and the second communication device on the second network, copying a data stream from the first session to the second session, wherein initiating the session on the second network and copying a data stream from the first session to the second session are performed prior to termination of the first session, determining whether the second session is established, and in response to determining the second session is established, terminating the first session.

2. The method of claim 1, wherein switching the first streaming session from the first network to the second network further comprises buffering an outgoing data stream of the first session.

3. The method of claim 2, wherein the first communication device comprises a client device participating in the first session, wherein buffering is performed by the client device, and wherein the client device informs a user of the client device of possible delays in the media streaming session.

4. The method of claim 2, wherein the first communication device comprises a server participating in the first session, wherein buffering is performed by the server, and wherein the server buffers the outgoing data stream of the first session in response to losing an incoming data stream of the first session.

5. The method of claim 2, wherein switching the first streaming session from the first network to the second network further comprises:
   terminating the first session;
   initiating a second session on the second network; and
   streaming outgoing data on the second session.

6. The method of claim 5, wherein the second communication device comprises a recipient client device and initiating a second session on the second network is based on a presence of recipient client device on the second network.

7. The method of claim 5, wherein streaming outgoing data on the second session comprises beginning the second session with buffered outgoing data of the first session.

8. The method of claim 1, wherein the first communication device comprises a client device participating in the first session and switching the first streaming session from the first network to the second network is performed by the client device.

9. The method of claim 8, wherein determining to switch the first streaming session from the first network to the second network is based on detecting a loss of the first network.

10. The method of claim 8, wherein determining to switch the first streaming session from the first network to the second network is based on a user input.

11. The method of claim 8, wherein the second communication device comprises a server supporting the first streaming session and an indication of determining to switch the first streaming session from the first network to the second network is transmitted from the client device to the server supporting the first streaming session via an out-of-band communication channel.

12. The method of claim 1, wherein the first communication device comprises a server supporting the first session and determining whether to switch the first streaming session from the first network and switching the first streaming session from the first network to the second network are performed by the server.

13. A system for providing a media streaming session, the system comprising:
   a first network;
   a second network;
   a server communicatively coupled with the first network and the second network and adapted to participate in a first streaming session via the first network; and
   a client device communicatively coupled with the first network and the second network and adapted to participate in the first streaming session with the server via the first network, detect the second network, determine whether to switch the first streaming session from the first network, and in response to determining to switch the first streaming session from the first network, initiate a session on the second network, copy a data stream from the first session to the second session, determine whether the second session is established and, in response to determining the second session is established, terminate the first session.

14. The system of claim 13, wherein the client device is further adapted to buffer an outgoing data stream of the first session and inform a user possible delays in the media streaming session, wherein the server is further adapted to buffer an outgoing data stream of the first session in response to losing an incoming data stream of the first session, wherein the client device is further adapted to terminate the first session and stream outgoing data on the second session, and wherein the client device and the server are adapted to stream outgoing data on the second session beginning with buffered outgoing data of the first session.

15. The system of claim 13, wherein the client device determines to switch the first streaming session from the first network to the second network based on detecting a loss of the first network or based on relative costs of the first network and the second network.

16. A system comprising:
   a first network;
   a first client device communicatively coupled with the first network and adapted to participate in a first streaming session on the first network;
   a second client device communicatively coupled with the first network;
   a third client device communicatively coupled with the first network and adapted to participate in the first streaming session with the first client device via the first network, detect the second client device, determine whether to switch the first streaming session from the first client device, and in response to determining to switch the first streaming session from the first client device, switch the first streaming session from the first client device to the second client device; and
   a server communicatively coupled with the first network and adapted to receive a request to establish the first media session from one of the first client device or the third client device and, in response to the request, establish the first streaming session, wherein the server comprises a third-party call controller, wherein the third client device is adapted to switch the first streaming session from the first client device to the second client device by initiating a second session, wherein the server, in response to detecting the third client device initiating a second session, is further adapted to maintain the first session and establish the second session, and wherein the server is further adapted to inform users of the first client device and third client device of possible delays in the first session.

17. The system of claim 16, wherein the third client device determines to switch the first streaming session based on detecting a loss of the first network or based on a user input to the third client device.

18. The system of claim 16, further comprising a second network, wherein the first client device and third client device are communicatively coupled with the second network and wherein the third-party call controller is adapted to switch the first streaming session from the first network to the second network by initiating a second session on the second network, wherein the third-party call controller, in response to detecting the third client device initiating a second session, is further adapted to maintain the first session and establish the second session on the second network, and wherein the third client device determines to switch the first streaming session from the first network to the second network based on detecting a loss of the first network.

19. A system comprising:
   a first communication network;
   a second communication network;
   a first client device communicatively coupled with the first communication network;
   a second client device communicatively coupled with the first communication network and adapted to send a request to communicate with the first client device via the first communication network; and
   a server communicatively coupled with the first communication network and the second communication network and wherein the server is adapted to receive the request to communicate with the first client device from the second client device, establish a first communication session between the first client device and the second client device via the first communication network, receive a request from the second client device to switch networks, and switch the first communication session from the first communication network to the second communication network, wherein switching the first communication session from the first network to the second network comprises initiating a second communication session between the first client device and the second client device on the second network, copying a data stream from the first communication session to the second communication session, wherein initiating the second communication session on the second network and copying a data stream from the first communication session to the second communication session are performed prior to termination of the first communication session, determining whether the second communication session is established, and in response to determining the second communication session is established, terminating the first communication session.

20. The system of claim 19, wherein the second client device sends a request to switch networks in response to a user input to an application on the second client device.

21. The system of claim 19, wherein the system further comprises a third client device and the second client device sends the request to switch networks in response to a user input to an application on the third client device.

* * * * *

UNITED STATES PATENT AND TRADEMARK OFFICE
CERTIFICATE OF CORRECTION

PATENT NO. : 8,005,988 B2  
APPLICATION NO. : 12/726568  
DATED : August 23, 2011  
INVENTOR(S) : Maes Page 1 of 1

It is certified that error appears in the above-identified patent and that said Letters Patent is hereby corrected as shown below:

On front page, in column 2, under "Other Publications", line 2, delete "Whtie" and insert -- White --, therefor.

Signed and Sealed this  
Twenty-second Day of November, 2011

David J. Kappos  
*Director of the United States Patent and Trademark Office*